(12) United States Patent
Zhang et al.

(10) Patent No.: US 11,509,019 B2
(45) Date of Patent: Nov. 22, 2022

(54) ELECTROCHEMICAL DEVICE

(71) Applicant: NINGDE AMPEREX TECHNOLOGY LIMITED, Ningde (CN)

(72) Inventors: Yibo Zhang, Ningde (CN); Xiang Li, Ningde (CN); Bin Wang, Ningde (CN); Ying Shao, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 47 days.

(21) Appl. No.: 16/967,617

(22) PCT Filed: Mar. 27, 2020

(86) PCT No.: PCT/CN2020/081605
§ 371 (c)(1),
(2) Date: Aug. 5, 2020

(87) PCT Pub. No.: WO2020/200073
PCT Pub. Date: Oct. 8, 2020

(65) Prior Publication Data
US 2021/0242535 A1    Aug. 5, 2021

(30) Foreign Application Priority Data

Mar. 29, 2019 (CN) .......................... 201910253176.0

(51) Int. Cl.
*H01M 50/44*    (2021.01)
*H01M 50/414*    (2021.01)
(Continued)

(52) U.S. Cl.
CPC ....... *H01M 50/44* (2021.01); *H01M 10/0525* (2013.01); *H01M 50/414* (2021.01);
(Continued)

(58) Field of Classification Search
CPC ........................... H01M 50/44; H01M 50/449
See application file for complete search history.

(56) References Cited

U.S. PATENT DOCUMENTS

2005/0266150 A1    12/2005    Yong et al.
2012/0082884 A1    4/2012    Orilall et al.
(Continued)

FOREIGN PATENT DOCUMENTS

CN    102242464 A    11/2011
CN    202231097 U    5/2012
(Continued)

OTHER PUBLICATIONS

Chinese First Office Action dated Apr. 20, 2021, in counterpart Chinese application CN201910253176.0, 14 pages in Chinese.
(Continued)

*Primary Examiner* — Stephan J Essex
(74) *Attorney, Agent, or Firm* — Juan Carlos A. Marquez; Marquez IP Law Office, PLLC

(57) ABSTRACT

The present application relates to an electrochemical device. The electrochemical device includes: at least one electrode, the at least one electrode having a first surface; and a fiber coating layer, the fiber coating layer including a fiber and being disposed on the first surface. The electrochemical device has the advantages of high energy density, strong liquid retention ability, good drop resistance, good chemical stability and the like since its fiber coating layer has small thickness, high porosity and stronger interfacial adhesion to the electrode.

17 Claims, 4 Drawing Sheets

(51) Int. Cl.
  *H01M 50/46* (2021.01)
  *H01M 50/449* (2021.01)
  *H01M 50/431* (2021.01)
  *H01M 10/0525* (2010.01)

(52) U.S. Cl.
  CPC ....... *H01M 50/431* (2021.01); *H01M 50/449* (2021.01); *H01M 50/46* (2021.01)

(56) References Cited

U.S. PATENT DOCUMENTS

| | | | |
|---|---|---|---|
| 2014/0349194 | A1 | 11/2014 | Kumabuchi |
| 2015/0171393 | A1* | 6/2015 | Ogata .................. H01M 50/40 429/246 |
| 2015/0380706 | A1 | 12/2015 | Yu et al. |
| 2017/0346063 | A1* | 11/2017 | Wong ................ H01M 10/0525 |
| 2019/0237731 | A1* | 8/2019 | Park .................... H01M 50/449 |

FOREIGN PATENT DOCUMENTS

| | | |
|---|---|---|
| CN | 102668172 A | 9/2012 |
| CN | 103094513 A | 5/2013 |
| CN | 103168384 A | 6/2013 |
| CN | 103219483 A | 7/2013 |
| CN | 103862752 A | 6/2014 |
| CN | 106252560 A | 12/2016 |
| CN | 106558665 A | 4/2017 |
| CN | 107004808 A | 8/2017 |
| CN | 107431165 A | 12/2017 |
| CN | 109802083 A | 5/2019 |

OTHER PUBLICATIONS

PCT International Search Report dated Jun. 23, 2020 in counterpart PCT application PCT/CN2020/081605, 6 pages.
PCT Written Opinion dated Jun. 23, 2020 in counterpart PCT application PCT/CN2020/081605, 4 pages.

* cited by examiner

ELECTROCHEMICAL DEVICE

CROSS REFERENCE TO RELATED APPLICATIONS

The present application is a National Stage application of PCT international application: PCT/CN2020/081605, filed on 27 Mar. 2020, which claims the benefit of priority from the China Patent Application No. 201910253176.0, filed on 29 Mar. 2019, the disclosure of which is hereby incorporated by reference in its entirety.

BACKGROUND

1. Technical Field

The present application relates to the technical field of energy storage, and more particularly to an electrochemical device.

2. Description of the Related Art

Due to advantages such as large volume energy density and mass energy density, long cycle life, high nominal voltage, low self-discharge rate, small size and light weight, lithium ion batteries have wide applications in the field of consumer electronics. In the existing lithium ion battery system, the separator functions to ensure lithium ion conduction and to block electron conduction, but has the problems that the separator severely shrinks at high temperatures to cause a short circuit, the separator gets turned inside at the edge when impacted to cause a short circuit and the portion in contact with the cathode may suffer from oxygenolysis. Therefore, there is a need for a novel electrochemical device that can solve the above problems.

SUMMARY

The present application provides an electrochemical device and a preparation method thereof in an attempt to solve at least one of the problems that exist in the related art at least to some extent.

According to embodiments of the present application, present application provides an electrochemical device, including: at least one electrode having a first surface; and a fiber coating layer, the fiber coating layer including fibers and being disposed on the first surface.

According to embodiments of the present application, the adhesion of the fiber coating layer to the first surface is about 2 N/m to about 100 N/m.

According to embodiments of the present application, the fibers include a first fiber and a second fiber, a diameter of the first fiber being less than a diameter of the second fiber, and the first fiber being adjacent to the first surface.

According to embodiments of the present application, the first fiber has the diameter of about 10 nm to about 2 μm, and the second fiber has the diameter of about 20 nm to about 5 μm.

According to embodiments of the present application, the fiber coating layer includes a first porous layer and a second porous layer; an average pore diameter of the first porous layer being less than an average pore diameter of the second porous layer; and the first porous layer being adjacent to the first surface.

According to embodiments of the present application, the first porous layer has the average pore diameter of about 20 nm to about 5 μm, and the second porous layer has the average pore diameter of greater than about 20 nm and less than or equal to about 10 μm.

According to embodiments of the present application, further comprising a third porous layer provided between the first porous layer and the second porous layer: an average pore diameter of the third porous layer being between the average pore diameters of the first porous layer and the second porous layer.

According to embodiments of the present application, a material of the fiber is at least one selected from the group consisting of: polyvinylidene fluoride, polyimide, polyamide, polyacrylonitrile, polyethylene glycol, polyoxyethylene, polyphenylene oxide, polypropylene carbonate, polymethyl methacrylate, polyethylene terephthalate, poly(ethylene oxide), a vinylidene fluoride-hexafluoropropylene copolymer, a vinylidene fluoride-trifluorochloroethylene copolymer and derivatives thereof.

According to embodiments of the present application, the fiber coating layer has a porosity of about 30% to about 95% and a thickness of about 1 μm to about 20 μm.

According to embodiments of the present application, the fiber coating layer further includes inorganic particles.

According to embodiments of the present application, a surface of the fiber coating layer is provided with an inorganic porous layer, the inorganic porous layer including inorganic particles.

According to embodiments of the present application, the inorganic particles are at least one selected from the group consisting of: (a) inorganic particles having a dielectric constant of 5 or more; (b) inorganic particles having piezoelectricity; and (c) inorganic particles having lithium ion conductivity.

According to embodiments of the present application, the inorganic particles are the inorganic particles having the dielectric constant of 5 or more; the inorganic particles include at least one selected from the group consisting of BaO, $SiO_2$, $SrTiO_3$, $SnO_2$, $CeO_2$, MgO, NiO, CaO, ZnO, $ZrO_2$, $Y_2O_3$, $Al_2O_3$, $TiO_2$, boehmite, magnesium hydroxide, aluminum hydroxide, and SiC.

According to embodiments of the present application, the inorganic particles are the inorganic particles having piezoelectricity; the inorganic particles include at least one selected from the group consisting of $BaTiO_3$, $Pb(Zr,Ti)O_3$, $Pb_{1-x}La_xZr_{1-y}Ti_yO_3$ ($0<x<1, 0<y<1$), $Pb(Mg_{1/3}Nb_{2/3})O_3$—$PbTiO_3$, and hafnium oxide.

According to embodiments of the present application, the inorganic particles are the inorganic particles having lithium ion conductivity; the inorganic particles include at least one selected from the group consisting of: lithium phosphate $Li_3PO_4$; lithium titanium phosphate $Li_xTi_y(PO_4)_3$, wherein $0<x<2, 0<y<3$; lithium aluminum titanium phosphate $Li_xAl_yTi_z(PO_4)_3$, wherein $0<x<2, 0<y<1$, and $0<z<3$; $Li_{1+x+y}(Al,Ga)_x(Ti,Ge)_{2-x}Si_yP_{3-y}O_{12}$, wherein $0 \le x \le 1$ and $0 \le y \le 1$; (LiAlTiP)$_xO_y$ type glass, wherein $0<x<4$ and $0<y<13$; lithium lanthanum titanate $Li_xLa_yTiO_3$, wherein $0<x<2$ and $0<y<3$; lithium germanium thiophosphate $Li_xGe_yP_zS_w$, wherein $0<x<4, 0<y<1, 0<z<1$, and $0<w<5$; lithium nitride $Li_xN_y$, wherein $0<x<4$ and $0<y<2$; $SiS_2$ type glass $Li_xSi_yS_z$, where $0<x<3, 0<y<2$, and $0<z<4$; and $P_2S_5$ type glass $Li_xP_yS_z$, wherein $0<x<3, 0<y<3$, and $0<z<7$.

According to embodiments of the present application, the inorganic porous layer has a thickness of about 0.1 μm to about 20 μm and a porosity of about 10% to about 40%.

According to embodiments of the present application, the at least one electrode includes a current collector, and at least one surface of the current collector is provided with a conductive coating.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the existing technology so as to facilitate the description of the embodiments of the present application. Obviously, the accompanying drawings described below are only part of the embodiments of the present application. For a person skilled in the art, the accompanying drawings of other embodiments can still be obtained according to the structures illustrated in the accompanying drawings.

DETAILED DESCRIPTION

Figure 1:
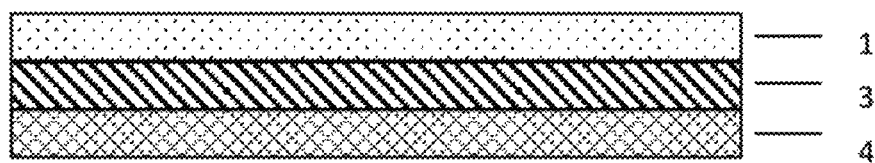
FIG. 1 shows an electrode coated with a fiber coating layer on a single side according to an embodiment.

Embodiments of the present application are described in detail below. Throughout the specification of the subject application, the same or similar components and components having the same or similar functions are denoted by similar reference numerals. The embodiments described herein with respect to the accompanying drawings are illustrative and graphical, and are used for providing a basic understanding on the present application. The embodiments of the present application should not be construed as limiting the present application.

As used herein, the terms "substantially," "generally," "essentially" and "about" are used to describe and explain small variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference value between the two values is less than or equal to ±10% of the average of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), then the two values can be considered "substantially" the same.

Further, for convenience of description, "first," "second," "third" and the like may be used herein to distinguish different components of one drawing or series of drawings. "First," "second," "third" and the like are not intended to describe the corresponding components.

In addition, amounts, ratios and other numerical values are sometimes presented herein in a range format. It should be appreciated that such range formats are for convenience and conciseness, and should be flexibly understood as including not only values explicitly specified to range constraints, but also all individual values or sub-ranges within the ranges, as if each value and each sub-range are explicitly specified.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

Electrochemical Device

Embodiments of the present application provide an electrochemical device. The electrochemical device includes at least one electrode and a fiber coating layer, the at least one electrode having a first surface, and the fiber coating layer including fibers and being disposed on the first surface.

In some embodiments, the electrochemical device may be a separator-free lithium ion battery. The separator-free lithium ion battery will not use a conventional separator material, but utilizes a fiber coating layer on the surface of the electrode to block electrons and conduct ions.

The electrochemical device of the embodiment of the present application is realized by preparing a fiber coating layer on the electrode by a spinning method, and the fiber coating layer has good uniformity, high porosity, good chemical stability, high production rate and good safety. The fiber coating layer of the electrochemical device includes fibers, and the material of the fibers may be at least one selected from the group consisting of: polyvinylidene fluoride (PVDF), polyimide, polyamide, polyacrylonitrile (PAN), polyethylene glycol, polyoxyethylene, polyphenylene oxide (PPO), polypropylene carbonate (PPC), polymethyl methacrylate (PMMA), polyethylene terephthalate, poly(ethylene oxide) (PEO), a vinylidene fluoride-hexafluoropropylene copolymer, a vinylidene fluoride-trifluorochloroethylene copolymer and derivatives thereof.

The fibers of the fiber coating layer may include a first fiber and a second fiber having different diameters. A diameter of the first fiber is less than a diameter of the second fiber, and the first fiber is adjacent to a surface of the electrode. Therefore, it is possible to increase the interfacial adhesion by using the first fiber having a smaller diameter to have larger contact area with the electrode, and to enhance the mechanical strength by using the second fiber having a larger diameter as the main body of the fiber coating layer.

In some embodiments, the first fiber may have the diameter of about 10 nm to about 2 μm. In some embodiments, the first fiber may have the diameter of about 50 nm, about 100 nm, about 500 nm, about 1 μm, about 1.5 μm, about 10 nm to about 50 nm, about 50 nm to about 100 nm, about 100 nm to about 500 nm, about 500 nm to about 1 μm, about 1.5 μm to about 2 μm, about 500 nm to about 2 μm, or the like.

In some embodiments, the second fiber may have the diameter of about 20 nm to about 5 μm. In some embodiments, the second fiber may have the diameter of about 50 nm, about 100 nm, about 500 nm, about 1 μm, about 1.5 μm, about 2 μm, about 3 μm, about 4 μm, about 20 nm to about 50 nm, about 50 nm to about 100 nm, about 100 nm to about 500 nm, about 500 nm to about 1 μm, about 1 μm to about 2 μm, about 1 μm to about 3 μm, about 2 μm to about 4 μm, about 1 μm to about 5 μm, or the like.

In some embodiments, the ratio of the diameter of the second fiber to the diameter of the first fiber may be about 1.01 to about 500. In some embodiments, the ratio of the diameter of the second fiber to the diameter of the first fiber may be about 5, about 10, about 50, about 100, about 200, about 300, about 400, about 5 to about 50, about 5 to about 100, about 50 to about 200, about 50 to about 500, about 100 to about 200, about 100 to about 500, or the like.

In some embodiments, the manner in which the diameters of the fibers of the fiber coating layer vary may be gradient in the thickness direction. For example, the first fiber region adjacent to the first surface of the electrode gradually transitions to a first fiber and second fiber hybrid region, and then transitions to the second fiber region away from the first surface of the electrode.

In some embodiments, there may be a distinct interface between the first fiber and the second fiber in the fiber coating layer.

In some embodiments, the fiber coating layer may include a first porous layer and a second porous layer, the fibers in the first porous layer and the second porous layer have the same diameter; an average pore diameter of the first porous layer is less than an average pore diameter of the second porous layer; and the first porous layer is adjacent to the first surface of the electrode. By using the denser distribution of the first porous layer having a smaller average pore diameter adjacent to the first surface, the interfacial adhesion between the fiber coating layer and the electrode can be enhanced, and the second porous layer having a larger average pore diameter away from the first surface can enhance the average pore diameter of the entire fiber coating layer due to the larger average pore diameter, which facilitates the conduction of ions (e.g., lithium ions) between the fiber coating layers, thereby improving the electrochemical performance such as the cycle performance of the electrochemical device (e.g., lithium ion battery).

In some embodiments, the first porous layer may have an average pore diameter of about 20 nm to about 5 μm. In some embodiments, the first porous layer may have the average pore diameter of about 50 nm, about 100 nm, about 500 nm, about 1 μm, about 2 μm, about 3 μm, about 4 μm, about 20 nm to about 50 nm, about 50 nm to about 100 nm, about 100 nm to about 500 nm, about 500 nm to about 1 μm, about 1 μm to about 2 μm, about 1 μm to about 3 μm, about 2 μm to about 4 μm, about 1 μm to about 5 μm or the like.

In some embodiments, the second porous layer may have the average pore diameter of greater than about 20 nm and less than or equal to about 10 μm. In some embodiments, the second porous layer may have the average pore diameter of about 100 nm to about 10 μm. In some embodiments, the second porous layer may have the average pore diameter of about 200 nm, about 500 nm, about 1 μm, about 2 μm, about 3 μm, about 4 μm, about 5 μm, about 8 μm, about 200 nm to about 500 nm, about 500 nm to about 1 μm, about 1 μm to about 2 μm, about 1 μm to about 3 μm, about 1 μm to about 4 μm, about 1 μm to about 5 μm, about 5 μm to about 8 μm, about 5 μm to about 10 μm, or the like.

In some embodiments, the ratio of the average pore diameter of the second porous layer to the average pore diameter of the first porous layer may be about 1.01 to about 500. In some embodiments, the ratio may be about 5, about 10, about 20, about 50, about 100, about 200, about 300, about 400, or the like.

In some embodiments, the fiber coating layer may include two first porous layers and a second porous layer, where one of the first porous layers is adjacent to the first surface of the electrode, and the second porous layer is disposed between the two first porous layers. In some embodiments, a third porous layer may be further included between the first porous layer and the second porous layer, the average pore diameter of the third porous layer being between the average pore diameters of the first porous layer and the second porous layer.

In some embodiments, the fiber coating layer may include a first porous layer and a second porous layer, the first porous layer including a first fiber, the second porous layer including a second fiber, the diameter of the first fiber being less than the diameter of the second fiber, the average pore diameter of the first porous layer being less than the average pore diameter of the second porous layer, and the first porous layer being adjacent to the first surface of the electrode. That is, the first porous layer is composed of the first fiber and the second porous layer is composed of the second fiber, so that superior performance can be obtained.

In some embodiments, the fiber coating layer may be formed by electrospinning, jet spinning, melt spinning, centrifugal spinning or the like. The jet spinning has the preparation rate of about 10 times that of electro spinning, and has a distinct advantage especially in the preparation of large-diameter fibers. In some embodiments, the fiber coating layer may be formed by electrospinning and jet spinning, thereby further increasing the production rate.

In some embodiments, the fiber coating layer may be prepared by multiple spinning units. For example, multiple different spinning units can be connected in series to prepare a fiber coating layer having a multilayer structure, or the multiple spinning units may have an overlapping region to prepare a fiber coating layer having a gradient spinning structure.

Figure 2:
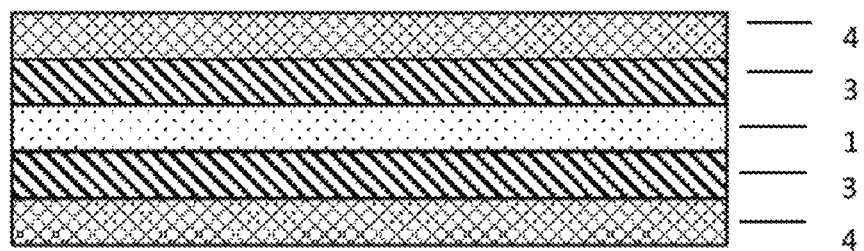
FIG. 2 shows an electrode coated with a fiber coating layer on double sides according to an embodiment.

In some embodiments, the at least one electrode of the electrochemical device may include a cathode and/or an anode, and a conventional electrode can be selected as the at least one electrode. In some embodiments, the fiber coating layer may be coated on a single side or on double sides of the electrode of the electrochemical device. FIG. 1 shows an electrode coated with a fiber coating layer on a single side according to an embodiment, where the electrode may be a cathode or an anode of an electrochemical device, the electrode may include a current collector 1 and an active material layer 3, the active material layer 3 is coated on the surface of the current collector 1, and the fiber coating layer 4 is coated on the surface of the active material layer 3. FIG. 2 shows an electrode coated with a fiber coating layer on double sides according to an embodiment, where the active material layer 3 and the fiber coating layer 4 are coated on two sides of the current collector 1.

Figure 3:
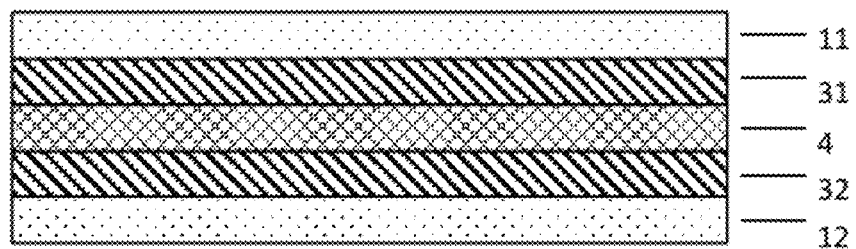
FIG. 3 shows the structure of an electrochemical device according to an embodiment.

FIG. 3 shows the structure of an electrochemical device according to an embodiment, wherein the electrochemical device may include a cathode current collector 11, a cathode active material layer 31, a fiber coating layer 4, an anode active material layer 32 and an anode current collector 12.

The fiber coating layer 4 may be coated on the cathode, coated on the anode or coated on both the cathode and the anode.

In some embodiments, the adhesion of the fiber coating layer to the first surface of the electrode may be about 2 N/m to about 100 N/m. In some embodiments, the adhesion of the fiber coating layer to the first surface may be about 5 N/m, about 10 N/m, about 20 N/m, about 50 N/m, about 5 N/m to about 10 N/m, about 10 N/m to about 20 N/m, about 10 N/m to about 50 N/m, about 10 N/m to about 100 N/m, about 50 N/m to about 100 N/m or the like.

In some embodiments, the fiber coating layer may have the porosity of about 30% to about 95%. In some embodiments, the fiber coating layer has the porosity of about 40%, about 50%, about 60%, about 70%, about 80%, about 90%, about 30% to about 40%, about 30% to about 50%, about 30% to about 60%, about 30% to about 70%, about 30% to about 80%, about 40% to about 50%, about 50% to about 90%, or the like. If the porosity of the fiber coating layer is too small, it may cause blockage of the ion transport path and hinder the normal circulation of the electrochemical device (e.g., lithium ion battery). If the porosity of the fiber coating layer is too large, the structure becomes unstable, the mechanical strength is too poor, and the puncturing of the particles on the surface of the electrode cannot be resisted.

In some embodiments, the fiber coating layer may have the thickness of about 1 μm to about 20 μm. In some embodiments, the fiber coating layer may have the thickness of about 2 μm, about 5 μm, about 10 μm, about 15 μm, about 1 μm to about 5 μm, about 1 μm to about 10 μm, about 2 μm to about 5 μm, about 2 μm to about 10 μm, about 5 μm to about 10 μm, about 10 μm to about 20 μm, about 5 μm to about 15 μm, or the like. The thickness of the fiber coating layer may be less than the thickness of the separator in the existing electrochemical device (e.g., lithium ion battery), thereby facilitating the increase in the energy density of the electrochemical device (e.g., lithium ion battery).

Figure 4:
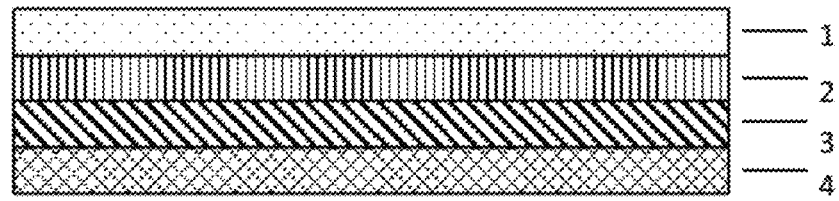
FIG. 4 shows an electrode coated with a conductive coating according to an embodiment.
Figure 5:
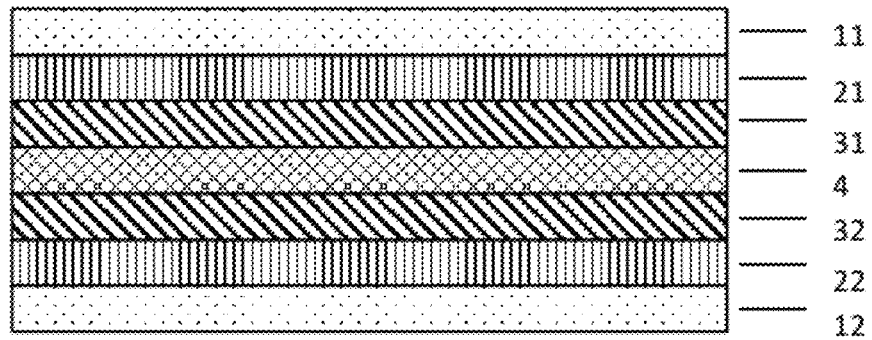
FIG. 5 shows the structure of an electrochemical device including a conductive coating according to an embodiment.

In some embodiments, the electrode of the electrochemical device may include a conductive coating. The conductive coating not only has strong conductivity, but also enhances the adhesion between the current collector and the active material layer. FIG. 4 shows an electrode coated with a conductive coating according to an embodiment, wherein the electrode may include a current collector 1, a conductive coating 2 and an active material layer 3, and the conductive coating 2, the active material layer 3 and a fiber coating layer 4 are coated on the surface of the current collector 1. As shown in FIG. 4, the conductive coating 2 is above the current collector 1, the active material layer 3 is above the conductive coating 2, and the fiber coating layer 4 is above the active material layer 3. According to an embodiment, the conductive coating 2, the active material layer 3 and the fiber coating layer 4 may be coated on two surfaces of the current collector 1. The electrode may be a cathode or an anode of an electrochemical device. FIG. 5 shows an electrochemical device including a conductive coating according to an embodiment, wherein the electrochemical device may include a cathode current collector 11, a cathode conductive coating 21, a cathode active material layer 31, a fiber coating layer 4, an anode active material layer 32, an anode conductive coating 22 and an anode current collector 12 disposed in order from the cathode to the anode. The fiber coating layer 4 may be coated on the cathode or the anode, or coated on both the cathode and the anode.

In some embodiments, the conductive coating may include a conductive agent and a binder, the conductive agent may be at least one selected from the group consisting of carbon nanotubes, Ketjen black, acetylene black, conductive carbon and graphene, and the binder may be selected from at least one of polyamide, polyurethane, an ethylene-vinyl acetate copolymer, an ethylene-vinyl alcohol copolymer, acrylate or polyvinylidene fluoride.

Figure 6:
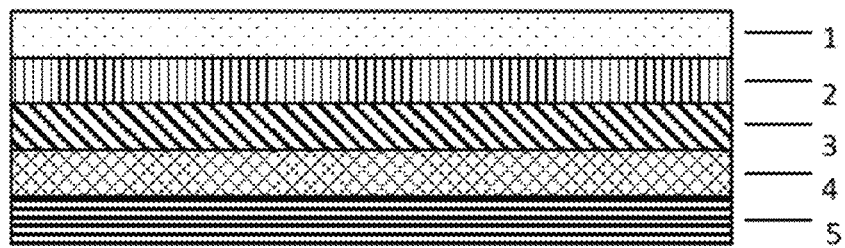
FIG. 6 shows an electrode coated with an inorganic porous layer according to an embodiment.
Figure 7:
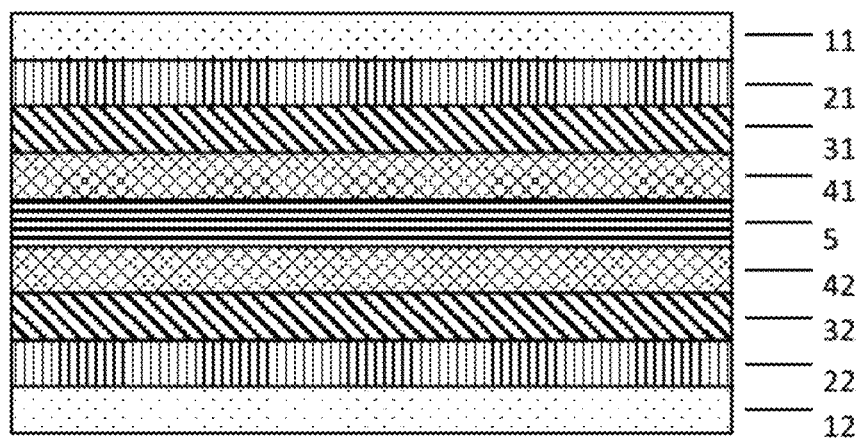
FIG. 7 shows an electrochemical device including an inorganic porous layer according to an embodiment.
Figure 8:
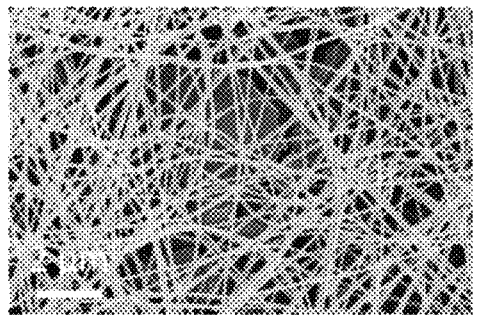
FIG. 8 shows an SEM image of the fiber coating layer adjacent to the electrode according to an embodiment.
Figure 9:
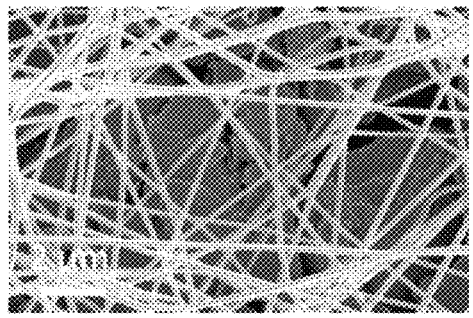
FIG. 9 shows an SEM image of the fiber coating layer away from the electrode according to an embodiment.

In some embodiments, the electrochemical device may further include an inorganic porous layer. FIG. 6 shows an electrode coated with an inorganic porous layer according to an embodiment, wherein the electrode may be a cathode or an anode of an electrochemical device, the electrode may include a current collector 1, a conductive coating 2 and an active material layer 3, and the conductive coating 2, the active material layer 3, a fiber coating layer 4 and an inorganic porous layer 5 are coated on the surface of the current collector 1. As shown in FIG. 6, the conductive coating 2 is above the current collector 1, the active material layer 3 is above the conductive coating 2, the fiber coating layer 4 is above the active material layer 3, and the inorganic porous layer 5 is above the fiber coating layer 4. According to an embodiment, the conductive coating 2, the active material layer 3, the fiber coating layer 4 and the inorganic porous layer 5 may be coated on two surfaces of the current collector 1. FIG. 7 shows an electrochemical device including an inorganic porous layer according to an embodiment, wherein the electrochemical device may include a cathode current collector 11, a cathode conductive coating 21, a cathode active material layer 31, a cathode fiber coating layer 41, an inorganic porous layer 5, an anode fiber coating layer 42, an anode active material 32, an anode conductive coating 22 and an anode current collector 12 disposed in order from the cathode to the anode.

In some embodiments, the inorganic porous layer may include inorganic particles. The inorganic particle may be at least one selected from the group consisting of: (a) inorganic particles having a dielectric constant of 5 or more; (b) inorganic particles having piezoelectricity; and (c) inorganic particles having lithium ion conductivity.

In some embodiments, the inorganic particles are the inorganic particles having the dielectric constant of 5 or more; the inorganic particles include at least one selected from the group consisting of BaO, $SiO_2$, $SrTiO_3$, $SnO_2$, $CeO_2$, MgO, NiO, CaO, ZnO, $ZrO_2$, $Y_2O_3$, $Al_2O_3$, $TiO_2$, boehmite, magnesium hydroxide, aluminum hydroxide, and SiC.

In some embodiments, the inorganic particles are the inorganic particles having piezoelectricity; the inorganic particles include at least one selected from the group consisting of $BaTiO_3$, $Pb(Zr,Ti)O_3$, $Pb_{1-x}La_xZr_{1-y}Ti_yO_3$ ($0<x<1$, $0<y<1$), $Pb(Mg_{1/3}Nb_{2/3})O_3$—$PbTiO_3$, and hafnium oxide.

In some embodiments, the inorganic particles are the inorganic particles having lithium ion conductivity; the inorganic particles include at least one selected from the group consisting of: lithium phosphate $Li_3PO_4$; lithium titanium phosphate $Li_xTi_y(PO_4)_3$, wherein $0<x<2$, $0<y<3$; lithium aluminum titanium phosphate $Li_xAl_yTi_z(PO_4)_3$, wherein $0<x<2$, $0<y<1$, and $0<z<3$; $Li_{1+x+y}(Al,Ga)_x(Ti,Ge)_{2-x}Si_yP_{3-y}O_{12}$, wherein $0\le x\le 1$ and $0\le y\le 1$; $(LiAlTiP)_xO_y$ type glass, wherein $0<x<4$ and $0<y<13$; lithium lanthanum titanate $Li_xLa_yTiO_3$, wherein $0<x<2$ and $0<y<3$; lithium germanium thiophosphate $Li_xGe_yP_zS_w$, wherein $0<x<4$, $0<y<1$, $0<z<1$, and $0<w<5$; lithium nitride $Li_xN_y$, wherein $0<x<4$ and $0<y<2$; $SiS_2$ type glass $Li_xSi_yS_z$, wherein $0<x<3$, $0<y<2$, and $0<z<4$; and $P_2S_5$ type glass $Li_xP_yS_z$, wherein $0<x<3$, $0<y<3$, and $0<z<7$. In some embodiments, the inorganic particles having lithium ion conductivity may also be at least one selected from the group consisting of: $Li_2O$, LiF, LiOH, $Li_2CO_3$, $LiAlO_2$, $Li_2O$—

$Al_2O_3$—$SiO_2$—$P_2O_5$—$TiO_2$—$GeO_2$ ceramic, garnet ceramic ($Li_{3+x}La_3M_2O_{12}$, wherein 0≤x≤5, and M is Te, Nb or Zr), and mixtures thereof.

In some embodiments, the inorganic porous layer may have the thickness of about 0.1 μm to about 20 μm. Taking a lithium ion battery as an example, if the thickness of the inorganic porous layer is too small, it cannot play a role of enhancing mechanical strength and inhibiting particle piercing and lithium dendrite growth. If the thickness of the inorganic porous layer is too large, lithium ion conduction is suppressed, and the polarization of the lithium ion battery is increased, affecting the performance of the lithium ion battery. In some embodiments, the inorganic porous layer may have the thickness of about 0.1 μm, about 0.5 μm, about 1 μm, about 5 μm, about 10 μm, about 15 μm, about 0.1 μm to about 1 μm, about 1 μm to about 5 μm, about 5 μm to about 10 μm, about 1 μm to about 10 μm, about 5 μm to about 15 μm, about 10 μm to about 20 μm, or the like.

In some embodiments, the inorganic porous layer may have the porosity of about 10% to about 40%. In some embodiments, the inorganic porous layer may have the porosity of about 10%, about 15%, about 20%, about 25%, about 30%, about 35%, about 10% to about 20%, about 10% to about 30% or the like.

In some embodiments, the inorganic porous layer may have the average pore diameter of about 0.1 μm to about 1 μm, for example, about 0.1 μm to about 0.5 μm or about 0.5 μm to about 1 μm.

In some embodiments, the inorganic porous layer has the electronic resistivity of greater than about $10^7$ Ωm. In some embodiments, the inorganic porous layer has the electronic resistivity of greater than about $10^{10}$ Ωm.

In some embodiments, the inorganic porous layer may have the ionic conductivity of about $10^{-8}$ S/cm to about $10^{-2}$ S/cm. In some embodiments, the inorganic porous layer has the ionic conductivity of about $10^{-8}$ S/cm to about $10^{-5}$ S/cm, about $10^{-7}$ S/cm to about $10^{-5}$ S/cm, about $10^{-6}$ S/cm to about $10^{-5}$ S/cm, about $10^{-5}$ S/cm to about $10^{-4}$ S/cm, about $10^{-5}$ S/cm to about $10^{-3}$ S/cm, about $10^{-5}$ S/cm to about $10^{-2}$ S/cm, about $10^{-3}$ S/cm to about $10^{-2}$ S/cm or the like.

The inorganic porous layer and the fiber coating layer may be bonded by hot pressing or adhesion. When the hot pressing is used, the pressure should be about 0.1 MPa to about 1 MPa. When the adhesion is used, the adhesive may be selected from at least one of: polyamide, polyurethane, an ethylene-vinyl acetate copolymer (EVA), an ethylene-vinyl alcohol copolymer (EVOH), acrylate or polyvinylidene fluoride. In addition, if the inorganic porous layer is directly deposited or coated on the fiber coating layer, the inorganic porous layer and the fiber coating layer can be naturally bonded without the adhesive.

When the inorganic porous layer is formed on the surface of the fiber coating layer, a part of the inorganic porous layer is inserted into the pores of the fiber coating layer to realize a certain fixing effect and further enhance the overall mechanical strength. In some embodiments, the inorganic porous layer is inserted into the fiber coating layer to the depth of about 0.1 μm to about 20 μm. In some embodiments, the inorganic porous layer is inserted into the fiber coating layer to the depth of about 0.5 μm, about 1 μm, about 5 μm, about 10 μm, about 0.1 μm to about 0.5 μm, about 0.5 μm to about 1 μm, about 0.5 μm to about 5 μm, about 1 μm to about 5 μm, about 1 μm to about 10 μm, about 5 μm to about 20 μm or the like.

In some embodiments, the fiber coating layer may include inorganic particles as described above. That is, the above inorganic particles may be formed directly inside the fiber coating layer. When the fiber coating layer includes the inorganic particles as described above, the inorganic particles may be inserted into the pores of the fiber coating layer to realize a certain fixing effect and further enhance the overall mechanical strength. The fiber coating layer according to the embodiments of the present application can be used to prepare a separator-free lithium ion battery to replace the existing lithium ion battery, and has the following advantages: simplifying the lithium ion battery production process; reducing the thickness of the separation layer to improve the energy density; enhancing the porosity of the separation layer to improve the liquid retention ability; enhancing the interfacial adhesion to the electrode to improve the rigidity of the lithium ion battery and improve the drop resistance; and having favorable chemical stability, etc.

In addition, the embodiments of the present application introduce a jet spinning method for the preparation of the fiber coating layer, which increases the production rate.

The electrochemical device may be a lithium ion battery. The lithium ion battery includes a cathode containing a cathode active material layer, an anode containing an anode active material layer, an electrolytic solution, and a fiber coating layer between the cathode and the anode. The cathode current collector may be aluminum foil or nickel foil, and the anode current collector may be copper foil or nickel foil.

In the above lithium ion battery, the cathode active material layer includes a cathode material capable of absorbing and releasing lithium (Li) (hereinafter, sometimes referred to as "a cathode material capable of absorbing/releasing lithium Li"). Examples of the cathode material capable of absorbing/releasing lithium (Li) can include at least one of lithium cobalt oxide, lithium nickel cobalt manganese oxide, lithium nickel cobalt aluminaum oxide, lithium manganese oxide, lithium manganese iron phosphate, lithium vanadium phosphate, lithium vanadyl phosphate, lithium iron phosphate, lithium titanium oxide or lithium-rich manganese-based materials.

In the above cathode material, the chemical formula of lithium cobalt oxide can be $Li_xCo_aM1_bO_{2-c}$, wherein M1 denotes at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b and c are respectively in the following ranges: 0.8≤x≤1.2, 0.8≤a≤1, 0≤b≤0.2 and −0.1≤c≤0.2.

In the above cathode material, the chemical formula of the lithium nickel cobalt manganese oxide or lithium nickel cobalt aluminum oxide can be $Li_yNi_dM2_eO_{2-f}$, wherein M2 denotes at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) or silicon (Si), and the values of y, d, e and f are respectively in the following ranges: 0.8≤y≤1.2, 0.3≤d≤0.98, 0.02≤e≤0.7, −0.1≤f≤0.2.

In the above cathode material, the chemical formula of lithium manganese oxide can be $Li_zMn_{2-g}M3_gO_{4-h}$, wherein M3 denotes at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g and h are respectively in the following ranges: $0.8 \leq z \leq 1.2$, $0 \leq g < 1.0$ and $-0.2 \leq h \leq 0.2$.

The anode active material layer includes an anode material capable of absorbing and releasing lithium (Li) (hereinafter, sometimes referred to as "an anode material capable of absorbing/releasing lithium Li"). Examples of the anode material capable of absorbing/releasing lithium (Li) can include a carbon material, a metal compound, an oxide, a sulfide, a nitride of lithium such as $LiN_3$, a lithium metal, a metal forming an alloy with lithium, or a polymer material.

Examples of the carbon material can include low graphitized carbon, easily graphitized carbon, artificial graphite, natural graphite, mesocarbon microbeads, soft carbon, hard carbon, pyrolytic carbon, coke, vitreous carbon, an organic polymer compound sintered body, carbon fibers and active carbon. The coke can include pitch coke, needle coke and petroleum coke. The organic polymer compound sintered body refers to a material obtained by calcining a polymer material such as phenol plastic or furan resin at an appropriate temperature to carbonize the polymer material, and some of these materials are classified into low graphitized carbon or easily graphitized carbon. Examples of the polymer material can include polyacetylene and polypyrrole.

Among these anode materials capable of absorbing/releasing lithium (Li), materials of which the charging and discharging voltages are close to the charging and discharging voltages of the lithium metal are selected. This is because if the charging and discharging voltages of the anode material are lower, the lithium ion battery has higher energy density more easily. The anode material can be selected from carbon materials because their crystal structures are only slightly changed upon charging and discharging, so good cycle characteristics and large charging and discharging capacities can be obtained. For example, graphite is selected because it can give a large electrochemical equivalent and a high energy density.

Further, the anode material capable of absorbing/releasing lithium (Li) can include elemental lithium metal, metal elements and semimetal elements capable of forming alloys together with lithium (Li), alloys and compounds including such elements, etc. For example, they are used together with a carbon material, in which case good cycle characteristics as well as high energy density can be obtained. In addition to the alloys including two or more metal elements, the alloys used here also include alloys including one or more metal elements and one or more semimetal elements. The alloys can be in the form of a solid solution, a eutectic crystal, an intermetallic compound and a mixture thereof.

Examples of the metal elements and the semimetal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds can include a material having a chemical formula: $Ma_sMb_tLi_u$ and a material having a chemical formula: $Ma_pMc_qMd_r$. In these chemical formulas, Ma denotes at least one of the metal elements and the semimetal elements capable of forming an alloy together with lithium; Mb denotes at least one of the metal elements and the semi-metal elements except lithium and Ma; Mc denotes at least one of non-metal elements; Md denotes at least one of the metal elements and the semi-metal elements except Ma; and s, t, u, p, q and r meet $s>0$, $t \geq 0$, $u \geq 0$, $p>0$, $q>0$ and $r \geq 0$.

In addition, an inorganic compound not including lithium (Li), such as $MnO_2$, $V_2O_5$, $V_6O_{13}$, NiS or MoS, can be used in the anode.

The above lithium ion battery further includes an electrolyte, the electrolyte can be one or more of a gel electrolyte, a solid electrolyte and an electrolytic solution, and the electrolytic solution includes a lithium salt and a non-aqueous solvent.

The lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB or lithium difluoroborate. For example, $LiPF_6$ is selected as the lithium salt because it can give high ionic conductivity and improve cycle characteristics.

The non-aqueous solvent can be a carbonate compound, a carboxylate compound, an ether compound, other organic solvent or a combination thereof.

The carbonate compound can be a chain carbonate compound, a cyclic carbonate compound, a fluorocarbonate compound or a combination thereof.

Examples of the chain carbonate compound are diethyl carbonate (DEC), dimethyl carbonate (DMC), dipropyl carbonate (DPC), methylpropyl carbonate (MPC), ethylpropyl carbonate (EPC), methylethyl carbonate (MEC) and a combination thereof. Examples of the cyclic carbonate compound are ethylene carbonate (EC), propylene carbonate (PC), butylene carbonate (BC), vinyl ethylene carbonate (VEC) or a combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate and a combination thereof.

Examples of the carboxylate compound are methyl acetate, ethyl acetate, n-propyl acetate, tert-butyl acetate, methyl propionate, ethyl propionate, propyl propionate, γ-butyrolactone, decalactone, valerolactone, mevalonolactone, caprolactone, methyl formate or a combination thereof.

Examples of the ether compound are dibutyl ether, tetraethylene glycol dimethyl ether, diglyme, 1,2-dimethoxyethane, 1,2-diethoxyethane, ethoxymethoxyethane, 2-methyltetrahydrofuran, tetrahydrofuran or a combination thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate and combinations thereof.

Hereinafter, a lithium ion battery is taken as an example, and combined with specific preparation methods and test data on the prepared lithium ion battery to show the preparation and performance of the lithium ion battery of the present application. However, a person skilled in the art will appreciate that the preparation methods described in the present application are merely examples, and that any other suitable preparation method is within the scope of the present application.

EMBODIMENTS

The present application will be further specifically described and explained in detail below by way of embodiments and comparative examples, but the present application is not limited to the embodiments described below.

Embodiment 1

(1) Preparation of Anode

Anode active materials, i.e., graphite, conductive carbon black, and styrene-butadiene rubber were mixed according to a weight ratio of 96:1.5:2.5, deionized water was added as a solvent to prepare a slurry having the solid content of 0.7, and the slurry was uniformly stirred. The slurry was uniformly coated on an anode current collector copper foil and dried at 110° C. to obtain an anode. After the coating was completed, the anode was cut into a size of 41 mm*61 mm for use.

A polyvinylidene fluoride layer having the thickness of 1 μm and the fiber diameter of 10 nm was prepared by electrospinning on the surface of the anode, and then a polyvinylidene fluoride layer having the thickness of 3 μm and the fiber diameter of 20 nm was prepared by jet spinning thereabove. The fiber coating layer on the surface of the anode was a layered structure including the above two polyvinylidene fluoride layers, and had the porosity of 80%.

After the above steps were completed, the single-sided coating of the anode was completed. Thereafter, these steps were also completed on the back surface of the anode in the same manner to obtain a double-sided coated anode.

(2) Preparation of Cathode

Cathode active materials, i.e., lithium cobalt oxide, conductive carbon black and polyvinylidene fluoride were mixed according to a weight ratio of 97.5:1.0:1.5, N-methylpyrrolidone was added as a solvent to prepare a slurry having the solid content of 0.75, and the slurry was uniformly stirred. The slurry was uniformly coated on a cathode current collector aluminum foil and dried at 90° C. to obtain a cathode. After the coating was completed, the cathode was cut into a size of 38 mm*58 mm for use.

A polyvinylidene fluoride layer having the thickness of 1 μm and the fiber diameter of 10 nm was prepared by electrospinning on the surface of the cathode, the porosity being 80%.

After the above steps were completed, the single-sided coating of the cathode was completed. Thereafter, these steps were also completed on the back surface of the cathode in the same manner to obtain a double-sided coated cathode.

(3) Preparation of Electrolytic Solution

In a dry argon atmosphere, organic solvents, i.e., ethylene carbonate, ethyl methyl carbonate and diethyl carbonate were first mixed according to a weight ratio of 30:50:20. Then, a lithium salt, i.e., lithium hexafluorophosphate, was added to the organic solvents, dissolved and uniformly mixed to obtain an electrolytic solution with the lithium salt concentration of 1.15 mol/L.

(4) Preparation of Lithium Ion Battery

The coated anode and cathode were opposed and laminated, wherein the fiber coating layer between the cathode and anode was of a layered structure, including the fiber coating layer on the surface of the cathode and the fiber coating layer on the surface of the anode, i.e., including three polyvinylidene fluoride layers. After the four corners of the entire laminated structure were fixed by a tape, they were placed in an aluminum plastic film, and after top side sealing, injection and packaging, the lithium ion battery (laminated structure) was finally obtained.

Embodiment 2

In the preparation of the anode, a polyvinylidene fluoride layer having the thickness of 1 μm and the fiber diameter of 100 nm was prepared by electrospinning on the surface of the anode, and then a polyvinylidene fluoride layer having the thickness of 3 μm and the fiber diameter of 1000 nm was prepared by jet spinning thereabove. The porosity of the fiber coating layer on the surface of the anode was 80%.

In the preparation of the cathode, a polyvinylidene fluoride layer having the thickness of 1 μm and the fiber diameter of 100 nm was prepared by electrospinning on the surface of the cathode. The porosity of the fiber coating layer on the surface of the cathode was 80%. The rest of the steps were the same as those in Embodiment 1.

Embodiment 3

In the preparation of the anode, a polyvinylidene fluoride layer having the thickness of 1 μm and the fiber diameter of 500 nm was prepared by electrospinning on the surface of the anode, and then a polyvinylidene fluoride layer having the thickness of 3 μm and the fiber diameter of 1500 nm was prepared by jet spinning thereabove. The porosity of the fiber coating layer on the surface of the anode was 80%.

A polyvinylidene fluoride layer having the thickness of 1 μm and the fiber diameter of 500 nm was prepared by electrospinning on the surface of the cathode. The porosity of the fiber coating layer on the surface of the cathode was 80%. The rest of the steps were the same as those in Embodiment 1.

Embodiment 4

In the preparation of the anode, a polyvinylidene fluoride layer having the thickness of 1 μm and the fiber diameter of 1000 nm was prepared by electrospinning on the surface of the anode, and then a polyvinylidene fluoride layer having the thickness of 3 μm and the fiber diameter of 3000 nm was prepared by jet spinning thereabove. The porosity of the fiber coating layer on the surface of the anode was 80%.

In the preparation of the cathode, a polyvinylidene fluoride layer having the thickness of 1 μm and the fiber diameter of 1000 nm was prepared by electrospinning on the surface of the cathode. The porosity of the fiber coating layer on the surface of the cathode was 80%. The rest of the steps were the same as those in Embodiment 1.

Embodiment 5

In the preparation of the anode, a polyvinylidene fluoride layer having the thickness of 1 μm and the fiber diameter of 2000 nm was prepared by electrospinning on the surface of anode, and then a polyvinylidene fluoride layer having the thickness of 3 μm and the fiber diameter of 5000 nm was prepared by jet spinning thereabove. The porosity of the fiber coating layer on the surface of the anode was 80%.

In the preparation of the cathode, a polyvinylidene fluoride layer having the thickness of 1 μm and the fiber diameter of 2000 nm was prepared by electrospinning on the surface of the cathode. The porosity of the fiber coating layer on the surface of the cathode was 80%. The rest of the steps were the same as those in Embodiment 1.

Embodiment 6

In the preparation of the anode, a polyvinylidene fluoride layer having the thickness of 0.2 μm and the fiber diameter of 100 nm was prepared by electrospinning on the surface of the anode, and then a polyvinylidene fluoride layer having the thickness of 0.6 μm and the fiber diameter of 1000 nm was prepared by jet spinning thereabove. The porosity of the fiber coating layer on the surface of the anode was 80%.

In the preparation of the cathode, a polyvinylidene fluoride layer having the thickness of 0.2 μm and the fiber diameter of 100 nm was prepared by electrospinning on the surface of the cathode. The porosity of the fiber coating layer on the surface of the cathode was 80%. The rest of the steps were the same as those in Embodiment 1.

Embodiment 7

In the preparation of the anode, a polyvinylidene fluoride layer having the thickness of 2 μm and the fiber diameter of 100 nm was prepared by electrospinning on the surface of the anode, and then a polyvinylidene fluoride layer having the thickness of 6 μm and the fiber diameter of 1000 nm was prepared by jet spinning thereabove. The porosity of the fiber coating layer on the surface of the anode was 80%.

In the preparation of the cathode, a polyvinylidene fluoride layer having the thickness of 2 μm and the fiber diameter of 100 nm was prepared by electrospinning on the surface of the cathode. The porosity of the fiber coating layer on the surface of the cathode was 80%. The rest of the steps were the same as those in Embodiment 1.

Embodiment 8

In the preparation of the anode, a polyvinylidene fluoride layer having the thickness of 4 μm and the fiber diameter of 100 nm was prepared by electrospinning on the surface of the anode, and then a polyvinylidene fluoride layer having the thickness of 12 μm and the fiber diameter of 1000 nm was prepared by jet spinning thereabove. The porosity of the fiber coating layer on the surface of the anode was 80%.

In the preparation of the cathode, a polyvinylidene fluoride layer having the thickness of 4 μm and the fiber diameter of 100 nm was prepared by electrospinning on the surface of the cathode. The porosity of the fiber coating layer on the surface of the cathode was 80%. The rest of the steps were the same as those in Embodiment 1.

Embodiment 9

In the preparation of the anode, a polyvinylidene fluoride layer having the thickness of 2 μm and the fiber diameter of 100 nm was prepared by electrospinning on the surface of the anode, and then a polyvinylidene fluoride layer having the thickness of 6 μm and the fiber diameter of 1000 nm was prepared by jet spinning thereabove. The porosity of the fiber coating layer on the surface of the anode was 30%.

In the preparation of the cathode, a polyvinylidene fluoride layer having the thickness of 2 μm and the fiber diameter of 100 nm was prepared by electrospinning on the surface of the cathode. The porosity of the fiber coating layer on the surface of the cathode was 30%. The rest of the steps were the same as those in Embodiment 1.

Embodiment 10

In the preparation of the anode, a polyvinylidene fluoride layer having the thickness of 2 μm and the fiber diameter of 100 nm was prepared by electrospinning on the surface of the anode, and then a polyvinylidene fluoride layer having the thickness of 6 μm and the fiber diameter of 1000 nm was prepared by jet spinning thereabove. The porosity of the fiber coating layer on the surface of the anode was 75%.

In the preparation of the cathode, a polyvinylidene fluoride layer having the thickness of 2 μm and the fiber diameter of 100 nm was prepared by electrospinning on the surface of the cathode. The porosity of the fiber coating layer on the surface of the cathode was 75%. The rest of the steps were the same as those in Embodiment 1.

Embodiment 11

In the preparation of the anode, a polyvinylidene fluoride layer having the thickness of 2 μm and the fiber diameter of 100 nm was prepared by electrospinning on the surface of the anode, and then a polyvinylidene fluoride layer having the thickness of 6 μm and the fiber diameter of 1000 nm was prepared by jet spinning thereabove. The porosity of the fiber coating layer on the surface of the anode was 95%.

In the preparation of the cathode, a polyvinylidene fluoride layer having the thickness of 2 μm and the fiber diameter of 100 nm was prepared by electrospinning on the surface of the cathode. The porosity of the fiber coating layer on the surface of the cathode was 95%. The rest of the steps were the same as those in Embodiment 1.

Embodiment 12

In the preparation of the anode, a polyvinylidene fluoride layer having the thickness of 8 μm was prepared by an electrospinning and jet spinning hybrid method on the surface of the anode, wherein the fibers adjacent to the anode had the diameter of 100 nm, the fibers away from the anode had the diameter of 1000 nm, and the fibers in the middle region had the diameters of 100 nm and 1000 nm, wherein the polyvinylidene fluoride layer had a fiber diameter gradient structure. The porosity of the fiber coating layer on the surface of the anode was 75%.

In the preparation of the cathode, a polyvinylidene fluoride layer having the thickness of 2 μm and the fiber diameter of 100 nm was prepared by electrospinning on the surface of the cathode. The porosity of the fiber coating layer on the surface of the cathode was 75%. The rest of the steps were the same as those in Embodiment 1.

Embodiment 13

In the preparation of the anode, a polyacrylonitrile layer having the thickness of 2 μm and the fiber diameter of 100 nm was prepared by electrospinning on the surface of the anode, and then a polyacrylonitrile layer having the thickness of 6 μm and the fiber diameter of 1000 nm was prepared by jet spinning thereabove. The porosity of the fiber coating layer on the surface of the anode was 75%.

In the preparation of the cathode, a polyacrylonitrile layer having the thickness of 2 μm and the fiber diameter of 100 nm was prepared by electrospinning on the surface of the cathode. The porosity of the fiber coating layer on the surface of the cathode was 75%. The rest of the steps were the same as those in Embodiment 1.

Embodiment 14

A poly(ethylene oxide) layer having the thickness of 2 μm and the fiber diameter of 100 nm was prepared by electrospinning on the surface of the anode, and then a poly(ethylene oxide) layer having the thickness of 6 μm and the fiber diameter of 1000 nm was prepared by jet spinning thereabove. The porosity of the fiber coating layer on the surface of the anode was 75%.

A polyethylene oxide layer having the thickness of 2 μm and the fiber diameter of 100 nm was prepared by electrospinning on the surface of the cathode. The porosity of the fiber coating layer on the surface of the cathode was 75%. The rest of the steps were the same as those in Embodiment 1.

Embodiment 15

The preparation method was the same as that in Embodiment 10, except that a conductive coating was coated on cathode and anode current collectors. In Embodiment 15, a conductive coating was first prepared on an anode current collector copper foil and a cathode current collector aluminum foil respectively, and then a lithium ion battery was prepared according to the preparation method of Embodiment 10. The method for preparing the anode conductive coating was as follows: conductive carbon black and styrene-butadiene rubber were mixed according to a weight ratio of 95:5, deionized water was added as a solvent to prepare a slurry having the solid content of 0.8, and the slurry was uniformly stirred. The slurry was uniformly coated on an anode current collector copper foil and dried at 110° C. to obtain the anode conductive coating. The method for preparing the cathode conductive coating was as follows: conductive carbon black and styrene-butadiene rubber were mixed according to a weight ratio of 97:3, deionized water was added as a solvent to prepare a slurry having the solid content of 0.85, and the slurry was uniformly stirred. The slurry was uniformly coated on a cathode current collector aluminum foil and dried at 110° C. to obtain the cathode conductive coating.

Embodiment 16

The preparation method was the same as that in Embodiment 15, except that an inorganic porous layer was disposed on the fiber coating layer on the surface of the anode. The preparation method of the inorganic porous layer was as follows: aluminum oxide ($Al_2O_3$) as inorganic particles and polyvinylidene fluoride as a binder were mixed according to a weight ratio of 95:5, N-methylpyrrolidone was added as a solvent to prepare a slurry having the solid content of 0.8, and the slurry was uniformly stirred. The slurry was uniformly coated on a fiber coating layer and dried at 90° C. to obtain the inorganic porous layer. The inorganic porous layer had the thickness of 3 μm, the porosity of 30% and the pore diameter of <1 μm.

Embodiment 17

The preparation method was the same as that in Embodiment 16, except that the inorganic particles were zinc oxide ($ZnO_2$) and the binder was polyurethane.

Embodiment 18

The preparation method was the same as that in Embodiment 16, except that the inorganic porous layer had the porosity of 15%.

Embodiment 19

The preparation method was the same as that in Embodiment 16, except that the inorganic porous layer had the thickness of 2 μm.

Embodiment 20

In the preparation of the anode, a polyvinylidene fluoride layer (fiber diameter of 100 nm) having the thickness of 1 μm and the average pore diameter of 20 nm was prepared by electrospinning on the surface of the anode, and then a polyvinylidene fluoride layer (fiber diameter of 100 nm) having the thickness of 3 μm and the average pore diameter of 100 nm was prepared by jet spinning thereabove. The fiber coating layer on the surface of the anode was a layered structure, and had the porosity of 80%.

In the preparation of the cathode, a polyvinylidene fluoride layer (fiber diameter of 100 nm) having the thickness of 1 μm and the average pore diameter of 20 nm was prepared by electrospinning on the surface of the cathode. The porosity of the fiber coating layer on the surface of the cathode was 80%. The rest of the steps were the same as those in Embodiment 1.

Embodiment 21

In the preparation of the anode, a polyvinylidene fluoride layer (fiber diameter of 100 nm) having the thickness of 1 μm and the average pore diameter of 200 nm was prepared by electrospinning on the surface of the anode, and then a polyvinylidene fluoride layer (fiber diameter of 100 nm) having the thickness of 3 μm and the average pore diameter of 1000 nm was prepared by jet spinning thereabove. The porosity of the fiber coating layer on the surface of the anode was 80%.

In the preparation of the cathode, a polyvinylidene fluoride layer (fiber diameter of 100 nm) having the thickness of 1 μm and the average pore diameter of 200 nm was prepared by electrospinning on the surface of the cathode. The porosity of the fiber coating layer on the surface of the cathode was 80%. The rest of the steps were the same as those in Embodiment 1.

Embodiment 22

In the preparation of the anode, a polyvinylidene fluoride layer (fiber diameter of 100 nm) having the thickness of 1 μm and the average pore diameter of 500 nm was prepared by electrospinning on the surface of the anode, and then a polyvinylidene fluoride layer (fiber diameter of 100 nm) having the thickness of 3 μm and the average pore diameter of 2000 nm was prepared by jet spinning thereabove. The porosity of the fiber coating layer on the surface of the anode was 80%.

In the preparation of the cathode, a polyvinylidene fluoride layer (fiber diameter of 100 nm) having the thickness of 1 μm and the average pore diameter of 500 nm was prepared by electrospinning on the surface of the cathode. The porosity of the fiber coating layer on the surface of the cathode was 80%. The rest of the steps were the same as those in Embodiment 1.

Embodiment 23

In the preparation of the anode, a polyvinylidene fluoride layer (fiber diameter of 100 nm) having the thickness of 1 μm and the average pore diameter of 2000 nm was prepared by electrospinning on the surface of the anode, and then a polyvinylidene fluoride layer (fiber diameter of 100 nm) having the thickness of 3 μm and the average pore diameter of 5000 nm was prepared by jet spinning thereabove. The porosity of the fiber coating layer on the surface of the anode was 80%.

In the preparation of the cathode, a polyvinylidene fluoride layer (fiber diameter of 100 nm) having the thickness of 1 μm and the average pore diameter of 2000 nm was prepared by electro spinning on the surface of the cathode. The porosity of the fiber coating layer on the surface of the cathode was 80%. The rest of the steps were the same as those in Embodiment 1.

Embodiment 24

In the preparation of the anode, a polyvinylidene fluoride layer (fiber diameter of 100 nm) having the thickness of 1 μm and the average pore diameter of 5000 nm was prepared by electrospinning on the surface of the anode, and then a polyvinylidene fluoride layer (fiber diameter of 100 nm) having the thickness of 3 μm and the average pore diameter of 10000 nm was prepared by jet spinning thereabove. The porosity of the fiber coating layer on the surface of the anode was 80%.

In the preparation of the cathode, a polyvinylidene fluoride layer (fiber diameter of 100 nm) having the thickness of 1 μm and the average pore diameter of 5000 nm was prepared by electro spinning on the surface of the cathode. The porosity of the fiber coating layer on the surface of the cathode was 80%. The rest of the steps were the same as those in Embodiment 1.

Embodiment 25

In the preparation of the anode, a polyacrylonitrile layer (fiber diameter of 100 nm) having the thickness of 2 μm and the average pore diameter of 200 nm was prepared by electrospinning on the surface of the anode, and then a polyacrylonitrile layer (fiber diameter of 100 nm) having the thickness of 6 μm and the average pore diameter of 1000 nm was prepared by jet spinning thereabove. The fiber coating layer on the surface of the anode was a layered structure, and had the porosity of 75%.

In the preparation of the cathode, a polyacrylonitrile layer (fiber diameter of 100 nm) having the thickness of 2 μm and the average pore diameter of 200 nm was prepared by electrospinning on the surface of the cathode. The porosity of the fiber coating layer on the surface of the cathode was 75%. The rest of the steps were the same as those in Embodiment 1.

Embodiment 26

In the preparation of the anode, a poly(ethylene oxide) layer (fiber diameter of 100 nm) having the thickness of 2 μm and the average pore diameter of 200 nm was prepared by electrospinning on the surface of the anode, and then a poly(ethylene oxide) layer (fiber diameter of 100 nm) having the thickness of 6 μm and the average pore diameter of 1000 nm was prepared by jet spinning thereabove. The fiber coating layer on the surface of the anode was a layered structure, and had the porosity of 75%.

In the preparation of the cathode, a poly(ethylene oxide) layer (fiber diameter of 100 nm) having the thickness of 2 μm and the average pore diameter of 200 nm was prepared by electrospinning on the surface of the cathode. The porosity of the fiber coating layer on the surface of the cathode was 75%. The rest of the steps were the same as those in Embodiment 1.

Embodiment 27

A conductive coating was first prepared on an anode current collector copper foil and a cathode current collector aluminum foil respectively. The method for preparing the anode conductive coating was as follows: conductive carbon black and styrene-butadiene rubber were mixed according to a weight ratio of 95:5, deionized water was added as a solvent to prepare a slurry having the solid content of 0.8, and the slurry was uniformly stirred. The slurry was uniformly coated on the anode current collector copper foil and dried at 110° C. to obtain the anode conductive coating. The method for preparing the cathode conductive coating was as follows: conductive carbon black and styrene-butadiene rubber were mixed according to a weight ratio of 97:3, deionized water was added as a solvent to prepare a slurry having the solid content of 0.85, and the slurry was uniformly stirred. The slurry was uniformly coated on the cathode current collector aluminum foil and dried at 110° C. to obtain the cathode conductive coating.

Next, in the preparation of the anode, a polyvinylidene fluoride layer (fiber diameter of 100 nm) having the thickness of 2 μm and the average pore diameter of 200 nm was prepared by electrospinning on the surface of the anode, and then a polyvinylidene fluoride layer (fiber diameter of 100 nm) having the thickness of 6 μm and the average pore diameter of 1000 nm was prepared by jet spinning thereabove. The fiber coating layer on the surface of the anode was a layered structure, and had a porosity of 75%.

Next, a polyvinylidene fluoride layer (fiber diameter of 100 nm) having a thickness of 2 μm and an average pore diameter of 200 nm was prepared by electrospinning on the surface of the cathode. The porosity of the fiber coating layer on the surface of the cathode was 75%. The rest of the steps were the same as those in Embodiment 1.

Embodiment 28

The preparation method was the same as that in Embodiment 27, except that an inorganic porous layer was disposed on the fiber coating layer on the surface of the anode. The preparation method of the inorganic porous layer was as follows: aluminum oxide ($Al_2O_3$) as inorganic particles and polyvinylidene fluoride as a binder were mixed according to a weight ratio of 95:5, N-methylpyrrolidone was added as a solvent to prepare a slurry having the solid content of 0.8, and the slurry was uniformly stirred. The slurry was uniformly coated on a fiber coating layer and dried at 90° C. to obtain the inorganic porous layer. The inorganic porous layer had the thickness of 3 μm, the porosity of 30% and the pore diameter of <1 μm.

Embodiment 29

In the preparation of the anode, a polyvinylidene fluoride layer having the thickness of 1 μm, the fiber diameter of 100 nm and the average pore diameter of 200 nm was prepared by electrospinning on the surface of the anode, and then a polyvinylidene fluoride layer having the thickness of 3 μm, the fiber diameter of 1000 nm and the average pore diameter of 1000 nm was prepared by jet spinning thereabove. The porosity of the fiber coating layer on the surface of the anode was 80%.

In the preparation of the cathode, a polyvinylidene fluoride layer having the thickness of 1 μm, the fiber diameter of 100 nm and the average pore diameter of 200 nm was prepared by electrospinning on the surface of the cathode.

The porosity of the fiber coating layer on the surface of the cathode was 80%. The rest of the steps were the same as those in Embodiment 1.

Comparative Example 1 is a lithium ion battery prepared according to a conventional method, and polyethylene (PE) having the thickness of 5 μm was used as a separator.

Comparative Example 2 is a lithium ion battery prepared according to a conventional method, and polyethylene (PE) having the thickness of 10 μm was used as a separator.

Comparative Example 3 is a separator-free lithium ion battery including a single-layer fiber coating layer. The specific preparation method was the same as that in Embodiment 1 except that a polyvinylidene fluoride layer having the thickness of 5 μm, the fiber diameter of 10 nm and the porosity of 80% was prepared by electrospinning on the surface of the anode, and there was no fiber coating layer on the surface of the cathode.

The preparation method of Comparative Example 4 was the same as that in Comparative Example 3, except that a polyvinylidene fluoride layer having the thickness of 5 μm, the fiber diameter of 1 μm and the porosity of 80% was prepared by jet spinning on the surface of the anode.

The preparation method of Comparative Example 5 was the same as that in Comparative Example 3, except that a polyvinylidene fluoride layer (fiber diameter of 100 nm) having the thickness of 5 μm, the average pore diameter of 20 nm and the porosity of 80% was prepared by electrospinning on the surface of the anode.

Test Methods and Test Results

The lithium ion batteries prepared in Embodiment 1 to Embodiment 19 and Comparative Example 1 to Comparative Example 4 above were subjected to an adhesion test, a three-point bending test and a cycle test. The test results are shown in Table 1 below.

The lithium ion batteries prepared in Embodiment 20 to Embodiment 28 and Comparative Example 1 and Comparative Example 5 above were subjected to an adhesion test and a cycle test. The test results are shown in Table 2 below.

The lithium ion batteries prepared in Embodiment 21 and Embodiment 29 above were subjected to an adhesion test, a three-point bending test and a cycle test. The test results are shown in Table 3 below.

Three-point bending test: the lithium ion battery was placed on two support points with a certain distance, and a load was downwards applied to the sample from a position above the midpoint of the two support points. Three-point bending occurred when the 3 contact points of the sample formed two equal moments. In the three-point bending test, the force at which the lithium ion battery deformation quantity was 1 mm was used to characterize the overall hardness of the lithium ion battery.

Adhesion testing method: the electrode (including the fiber coating layer on the surface) was taken out from a fresh lithium ion battery and cut into strips having the width of 2 cm, the fiber coating layer was pulled up from the surface of the electrode, and the fiber coating layer and the electrode were pulled apart at the angle of 180 degrees. The average value of the ratio of the force obtained at the time of pulling apart to the width of the electrode (force/electrode width) was measured as the adhesion.

Cycle performance test: the lithium ion battery was charged at a constant current of 0.7 C to 4.4 V, then charged at a constant voltage to 0.025 C, allowed to stand for 5 min, and discharged at a direct current of 0.5 C to 3.0 V; and the lithium ion battery was allowed to stand for 5 min, and after 50 cycles, the capacity retention rate after 50 cycles was calculated, wherein capacity retention rate=discharge capacity/first discharge capacity.

TABLE 1

| | Diameter of fiber of fiber coating layer on surface of anode adjacent to anode (nm) | Diameter of fiber of fiber coating layer on surface of anode away from anode (nm) | Total thickness of fiber coating layers on surfaces of cathode and anode (μm) | Porosity of fiber coating layer on surface of anode | Material of fiber coating layer on surface of anode | Material of inorganic porous layer |
|---|---|---|---|---|---|---|
| Comparative Example 1 | — | — | 5 | 30% | PE | — |
| Comparative Example 2 | — | — | 10 | 30% | PE | — |
| Comparative Example 3 | 10 | 10 | 5 | 80% | PVDF | — |
| Comparative Example 4 | 1000 | 1000 | 5 | 80% | PVDF | — |
| Embodiment 1 | 10 | 20 | 5 | 80% | PVDF | — |
| Embodiment 2 | 100 | 1000 | 5 | 80% | PVDF | — |
| Embodiment 3 | 500 | 1500 | 5 | 80% | PVDF | — |
| Embodiment 4 | 1000 | 3000 | 5 | 80% | PVDF | — |
| Embodiment 5 | 2000 | 5000 | 5 | 80% | PVDF | — |
| Embodiment 6 | 100 | 1000 | 1 | 80% | PVDF | — |
| Embodiment 7 | 100 | 1000 | 10 | 80% | PVDF | — |
| Embodiment 8 | 100 | 1000 | 20 | 80% | PVDF | — |
| Embodiment 9 | 100 | 1000 | 10 | 30% | PVDF | — |
| Embodiment 10 | 100 | 1000 | 10 | 75% | PVDF | — |
| Embodiment 11 | 100 | 1000 | 10 | 95% | PVDF | — |
| Embodiment 12 | 100 | 1000 | 10 | 75% | PVDF | — |
| Embodiment 13 | 100 | 1000 | 10 | 75% | PAN | — |
| Embodiment 14 | 100 | 1000 | 10 | 75% | PEO | — |
| Embodiment 15 | 100 | 1000 | 10 | 75% | PVDF | — |
| Embodiment 16 | 100 | 1000 | 10 | 75% | PVDF | $Al_2O_3$ |
| Embodiment 17 | 100 | 1000 | 10 | 75% | PVDF | $ZnO_2$ |
| Embodiment 18 | 100 | 1000 | 10 | 75% | PVDF | $Al_2O_3$ |
| Embodiment 19 | 100 | 1000 | 10 | 75% | PVDF | $Al_2O_3$ |

TABLE 1-continued

|  | Porosity of inorganic porous layer | Thickness of inorganic porous layer (μm) | Adhesion of fiber coating layer to cathode (N/m) | Adhesion of fiber coating layer to anode (N/m) | Three-point bending rigidity (N) | Discharge capacity after 50 cycles/first discharge capacity (%) |
|---|---|---|---|---|---|---|
| Comparative Example 1 | — | — | 0.8 | 0.5 | 324 | 92.3% |
| Comparative Example 2 | — | — | 0.8 | 0.5 | 330 | 92.4% |
| Comparative Example 3 | — | — | 10.4 | 6.5 | 391 | 93.6% |
| Comparative Example 4 | — | — | 4.3 | 2.7 | 385 | 94.2% |
| Embodiment 1 | — | — | 11.2 | 7.0 | 395 | 94.0% |
| Embodiment 2 | — | — | 10.7 | 6.7 | 415 | 94.4% |
| Embodiment 3 | — | — | 6.8 | 4.4 | 402 | 94.6% |
| Embodiment 4 | — | — | 4.7 | 2.9 | 396 | 94.8% |
| Embodiment 5 | — | — | 3.0 | 1.8 | 391 | 94.9% |
| Embodiment 6 | — | — | 5.8 | 3.7 | 354 | 96.1% |
| Embodiment 7 | — | — | 10.9 | 7.0 | 425 | 94.1% |
| Embodiment 8 | — | — | 11.3 | 7.2 | 439 | 90.3% |
| Embodiment 9 | — | — | 12.7 | 7.9 | 458 | 83.2% |
| Embodiment 10 | — | — | 10.5 | 6.6 | 427 | 94.0% |
| Embodiment 11 | — | — | 6.1 | 4.0 | 402 | 95.3% |
| Embodiment 12 | — | — | 10.6 | 6.7 | 430 | 94.1% |
| Embodiment 13 | — | — | 8.3 | 5.0 | 401 | 95.2% |
| Embodiment 14 | — | — | 9.6 | 6.4 | 413 | 92.8% |
| Embodiment 15 | — | — | 10.4 | 6.6 | 428 | 96.2% |
| Embodiment 16 | 30% | 3 | 10.3 | 6.5 | 440 | 96.1% |
| Embodiment 17 | 30% | 3 | 10.5 | 6.5 | 437 | 96.0% |
| Embodiment 18 | 15% | 3 | 10.3 | 6.2 | 445 | 93.7% |
| Embodiment 19 | 30% | 2 | 10.1 | 6.4 | 435 | 96.3% |

("—" in Table 1 denotes not added or not applicable)

TABLE 2

|  | Average pore diameter of fiber coating layer adjacent to anode in fiber coating layers on surface of anode (nm) | Average pore diameter of fiber coating layer away from anode in fiber coating layers on surface of anode (nm) | Total thickness of fiber coating layers on surfaces of anode and cathode (μm) | Porosity of fiber coating layers on surface of anode | Material of fiber coating layer on surface of anode | Material of inorganic porous layer |
|---|---|---|---|---|---|---|
| Comparative Example 1 | — | — | 5 | 30% | PE | — |
| Comparative Example 5 | 20 | 20 | 5 | 80% | PVDF | — |
| Embodiment 20 | 20 | 100 | 5 | 80% | PVDF | — |
| Embodiment 21 | 200 | 1000 | 5 | 80% | PVDF | — |
| Embodiment 22 | 500 | 2000 | 5 | 80% | PVDF | — |
| Embodiment 23 | 2000 | 5000 | 5 | 80% | PVDF | — |
| Embodiment 24 | 5000 | 10000 | 5 | 80% | PVDF | — |
| Embodiment 25 | 200 | 1000 | 10 | 75% | PAN | — |
| Embodiment 26 | 200 | 1000 | 10 | 75% | PEO | — |
| Embodiment 27 | 200 | 1000 | 10 | 75% | PVDF | — |
| Embodiment 28 | 200 | 1000 | 10 | 75% | PVDF | $Al_2O_3$ |

|  | Porosity of inorganic porous layer | Thickness of inorganic porous layer (μm) | Adhesion of fiber coating layer to cathode (N/m) | Adhesion of fiber coating layer to anode (N/m) | Discharge capacity after 50 cycles/first discharge capacity (%) |
|---|---|---|---|---|---|
| Comparative Example 1 | — | — | 0.8 | 0.5 | 92.3% |
| Comparative Example 5 | — | — | 10.4 | 6.3 | 93.6% |
| Embodiment 20 | — | — | 10.5 | 6.2 | 94.2% |
| Embodiment 21 | — | — | 9.5 | 5.9 | 95.0% |
| Embodiment 22 | — | — | 6.7 | 4.2 | 95.3% |
| Embodiment 23 | — | — | 4.9 | 2.9 | 95.4% |
| Embodiment 24 | — | — | 4.1 | 2.3 | 95.4% |

TABLE 2-continued

| | | | | | |
|---|---|---|---|---|---|
| Embodiment 25 | — | — | 8.1 | 5.1 | 95.1% |
| Embodiment 26 | — | — | 9.8 | 6.7 | 93.3% |
| Embodiment 27 | — | — | 10.5 | 6.3 | 96.1% |
| Embodiment 28 | 30% | 3 | 10.4 | 6.2 | 96.2% |

("—" in Table 2 denotes not added or not applicable)

TABLE 3

| | Average pore diameter of fiber coating layer adjacent to anode in fiber coating layers on surface of anode (nm) | Average pore diameter of fiber coating layer away from anode in fiber coating layers on surface of anode (nm) | Total thickness of fiber coating layers on surfaces of cathode and anode (μm) | Porosity of fiber coating layer on surface of anode | Material of fiber coating layer on surface of anode | Material of inorganic porous layer |
|---|---|---|---|---|---|---|
| Embodiment 21 | 200 | 1000 | 5 | 80% | PVDF | — |
| Embodiment 29 | 200 (fiber diameter 100 nm) | 1000 (fiber diameter 1000 nm) | 5 | 80% | PVDF | — |

| | Porosity of inorganic porous layer | Thickness of inorganic porous layer (μm) | Adhesion of fiber coating layer to cathode (N/m) | Adhesion of fiber coating layer to anode (N/m) | Three-point bending rigidity (N) | Discharge capacity after 50 cycles/first discharge capacity (%) |
|---|---|---|---|---|---|---|
| Embodiment 21 | — | — | 9.5 | 5.9 | 403 | 95.0% |
| Embodiment 29 | — | — | 9.7 | 6.0 | 415 | 95.1% |

("—" in Table 3 denotes not added or not applicable)

As can be seen from Table 1, compared with the conventional separator lithium ion battery in Comparative Example 1, in the case where the thickness of the fiber coating layer (or the separator) is the same, the lithium ion batteries of Embodiments 1 to Embodiment 5 can have stronger adhesion, greater rigidity and better cycle performance. This is because the lithium ion battery of the embodiments has a fiber coating layer disposed on the surface of the electrode. The fiber coating layer has a polyvinylidene fluoride layer having a smaller fiber diameter adjacent to the electrode and a polyvinylidene fluoride layer having the larger fiber diameter away from the electrode, and therefore, the adhesion of the fiber coating layer to the electrode is large and the mechanical strength of the fiber coating layer is high, so that the lithium ion battery can have a better interface bonding effect and a higher cycle capacity retention rate. Similarly, compared with Comparative Example 2, the lithium ion batteries of Embodiment 7 and Embodiment 9 to Embodiment 15 can have stronger adhesion and greater rigidity.

Compared with Comparative Example 3, in the case where the thickness of the fiber coating layer is the same, by setting the fiber diameter in the fiber coating layer differently, the lithium ion battery of Embodiment 1 can have stronger adhesion, greater rigidity and better cycle performance. This is because the fiber coating layer on the surface of the anode of the lithium ion battery of Embodiment 1 includes a polyvinylidene fluoride layer having the larger fiber diameter away from the anode. Therefore, the mechanical strength of the fiber coating layer is high. The fiber adjacent to the surface of the anode has the small diameter and the large contact area with the surface of the anode, and thus, has stronger adhesion than the fiber having the larger diameter, so that the lithium ion battery can have a better interface bonding effect and a higher cycle capacity retention rate. Similarly, compared with Comparative Example 4, the lithium ion battery of Embodiment 4 has stronger adhesion, greater stiffness and better cycle performance.

Compared with Comparative Example 4, in the case where the thickness of the fiber coating layer is the same, the lithium ion battery of Embodiment 2 can have stronger adhesion, greater rigidity and better cycle performance. This is because the fiber coating layer on the surface of the anode of the lithium ion battery of Embodiment 2 includes a polyvinylidene fluoride layer having the smaller fiber diameter adjacent to the anode. Therefore, the fiber coating layer has stronger adhesion to the anode, so that the lithium ion battery can have a better interface bonding effect and a higher cycle capacity retention rate.

It can be seen from Comparative Example 1 and Embodiments 20 to 24 that the fiber coating layer has better adhesion to the cathode and the anode, which can significantly improve the integration of the lithium ion battery and also enhance the cycle performance of the lithium ion battery. As can be seen from the comparison between Comparative Example 5 and Embodiment 20, in the case where the thickness of the fiber coating layer is the same, by setting the average pore diameter of the fiber coating layer differently, the cycle performance of the lithium ion battery can be effectively enhanced under the condition that the adhesion of the fiber coating layer to the electrode is constant, obtaining an unexpected effect.

It can be seen from Embodiment 21 and Embodiment 29 that in the case where the average pore diameter of the fiber coating layer is gradient, by further setting the fiber diameter in the fiber coating layer in a gradient distribution, the three-point bending rigidity of the lithium ion battery can be effectively enhanced without affecting other properties, obtaining an unexpected effect.

It can be seen from Table 1 that disposing the conductive coating and the inorganic porous layer in the separator-free lithium ion battery can enhance the three-point bending rigidity and cycle performance of the lithium ion battery, and finally achieves a level beyond the ordinary lithium ion battery.

References to "some embodiments," "part of embodiments," "one embodiment," "another example," "example," "specific example" or "part of examples" in the whole specification mean that at least one embodiment or example in the application includes specific features, structures, materials or characteristics described in the embodiments or examples. Thus, the descriptions appear throughout the specification, such as "in some embodiments," "in an embodiment," "in one embodiment," "in another example," "in one example," "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by a person skilled in the art that the above embodiments cannot be interpreted as limiting the present application, and the embodiments can be changed, substituted and modified without departing from the spirit, principle and scope of the present application.

What is claimed is:
1. An electrochemical device, comprising:
at least one electrode having a first surface; and
a fiber coating layer, the fiber coating layer comprising fibers and being disposed on the first surface, wherein,
the fiber coating layer comprises a first porous layer, a second porous layer and a third porous layer, the third porous layer provided between the first porous layer and the second porous layer;
an average pore diameter of the first porous layer is less than an average pore diameter of the second porous layer;
the first porous layer is adjacent to the first surface;
the average pore diameter of the first porous layer is 20 nm to 5 µm;
the average pore diameter of the second porous layer greater than 20 am and less than or equal to 10 µm, and
an average pore diameter of the third porous layer being between the average pore diameters of the first porous layer and the second porous layer.

2. The electrochemical device according to claim 1, wherein the adhesion of the fiber coating layer to the first surface is 2 N/m to 100 N/m.

3. The electrochemical device according to claim 1, wherein the fibers comprise a first fiber and a second fiber, a diameter of the first fiber being less than a diameter of the second fiber, and the first fiber being adjacent to the first surface.

4. The electrochemical device according to claim 3, wherein the first fiber has the diameter of 10 nm to 2 µm, and the second fiber has the diameter of 20 nm to 5 µm.

5. The electrochemical device according to claim 1, wherein a material of the fiber is at least one selected from the group consisting of polyvinylidene fluoride, polyimide, polyamide, polyacrylonitrile, polyethylene glycol, polyoxyethylene, polyphenylene oxide, polypropylene carbonate, polymethyl methacrylate, polyethylene terephthalate, poly (ethylene oxide), a vinylidene fluoride-hexafluoropropylene copolymer, a vinylidene fluoride-trifluorochloroethylene copolymer and derivatives thereof.

6. The electrochemical device according to claim 1, wherein the fiber coating layer has a porosity of 30% to 95% and a thickness of 1 µm to 20 µm.

7. The electrochemical device according to claim 1, wherein the fiber coating layer further comprises inorganic particles.

8. The electrochemical device according to claim 1, wherein a surface of the fiber coating layer is provided with an inorganic porous layer, the inorganic porous layer comprising inorganic particles.

9. The electrochemical device according to claim 7, wherein the inorganic particles are at least one selected from the group consisting of: (a) inorganic particles having a dielectric constant of 5 or more; (b) inorganic particles having piezoelectricity; and (c) inorganic particles having lithium ion conductivity.

10. The electrochemical device according to claim 9, wherein the inorganic particles are the inorganic particles having the dielectric constant of 5 or more; the inorganic particles comprise at least one selected from the group consisting of BaO, $SiO_2$, $SrTiO_3$, $SnO_2$, $CeO_2$, MgO, NiO, CaO, ZnO, $ZrO_2$, $Y_2O_3$, $Al_2O_3$, $TiO_2$, boehmite, magnesium hydroxide, aluminum hydroxide, and SiC.

11. The electrochemical device according to claim 9, wherein the inorganic particles are the inorganic particles having piezoelectricity; the inorganic particles comprise at least one selected from the group consisting of $BaTiO_3$, $Pb(Zr,Ti)O_3$, $Pb_{1-x}La_xZr_{1-y}Ti_yO_3$ (0<x<1, 0<y<1), $Pb(Mg_{1/3}Nb_{2/3})O_3$—$PbTiO_3$, and hafnium oxide.

12. The electrochemical device according to claim 9, wherein the inorganic particles are the inorganic particles having lithium ion conductivity; the inorganic particles comprise at least one selected from the group consisting of:
lithium phosphate $Li_3PO_4$;
lithium titanium phosphate $Li_xTi_y(PO_4)_3$, wherein 0<x<2, 0<y<3;
lithium aluminum titanium phosphate $Li_xAl_yTi_z(PO_4)_3$, wherein 0<x<2, 0<y<1, and 0<z<3;
$Li_{1+x+y}(Al,Ga)_x(Ti,Ge)_{2-x}Si_yP_{3-y}O_{12}$, wherein 0≤x≤1 and 0≤y≤1;
$(LiAlTiP)_xO_y$ type glass, wherein 0<x<4 and 0<y<13;
lithium lanthanum titanate $Li_xLa_yTiO_3$, wherein 0<x<2 and 0<y<3;
lithium germanium thiophosphate $Li_xGe_yP_zS_w$, wherein 0<x<4, 0<y<1, 0<z<1, and 0<w<5;
lithium nitride $Li_xN_y$, wherein 0<x<4 and 0<y<2;
$SiS_2$ type glass $Li_xSi_yS_z$, wherein 0<x<3, 0<y<2, and 0<z<4; and
$P_2S_5$ type glass $Li_xP_yS_z$, wherein 0<x<3, 0<y<3, and 0<z<7.

13. The electrochemical device according to claim 8, wherein the inorganic porous layer has a thickness of 0.1 µm to 20 µm and a porosity of 10% to 40%.

14. The electrochemical device according to claim 1, wherein the at least one electrode comprises a current collector, and at least one surface of the current collector is provided with a conductive coating.

15. The electrochemical device according to claim 8, wherein the inorganic particles are at least one selected from the group consisting of: (a) inorganic particles having a dielectric constant of 5 or more; (b) inorganic particles having piezoelectricity; and (c) inorganic particles having lithium ion conductivity.

16. The electrochemical device according to claim 15, wherein the inorganic particles are the inorganic particles having the dielectric constant of 5 or more; the inorganic particles comprise at least one selected from the group consisting of BaO, $SiO_2$, $SrTiO_3$, $SnO_2$, $CeO_2$, MgO, NiO, CaO, ZnO, $ZrO_2$, $Y_2O_3$, $Al_2O_3$, $TiO_2$, boehmite, magnesium hydroxide, aluminum hydroxide, and SiC.

17. The electrochemical device according to claim 15, wherein the inorganic particles are the inorganic particles having piezoelectricity; the inorganic particles comprise at least one selected from the group consisting of $BaTiO_3$, $Pb(Zr,Ti)O_3$, $Pb_{1-x}La_xZr_{1-y}Ti_yO_3$ ($0<x<1, 0<y<1$), $Pb(Mg_{1/3}Nb_{2/3})O_3$—$PbTiO_3$, and hafnium oxide.

\* \* \* \* \*